(12) United States Patent
Walter et al.

(10) Patent No.: US 6,888,345 B2
(45) Date of Patent: May 3, 2005

(54) METHOD AND ARRANGEMENT FOR CORRECTION OF EVALUATION OF A SWITCHING THRESHOLD OF A MAGNETIC SENSOR

(75) Inventors: Klaus Walter, Bietigheim-Bissingen (DE); Rasmus Rettig, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/953,848

(22) Filed: Sep. 29, 2004

(65) Prior Publication Data

US 2005/0073297 A1 Apr. 7, 2005

(30) Foreign Application Priority Data

Oct. 1, 2003 (DE) .......................................... 103 45 734

(51) Int. Cl.⁷ ................................................. G01B 7/30
(52) U.S. Cl. .............................. 324/207.2; 324/207.21; 324/207.25; 324/166
(58) Field of Search ....................... 324/207.11–207.13, 324/207.2, 207.21, 207.23, 207.24–207.26, 244, 251, 260, 527, 528, 529, 166

(56) References Cited

U.S. PATENT DOCUMENTS

2002/0109501 A1 * 8/2002 Schroeder .............. 324/207.21
2004/0100251 A1 * 5/2004 Lohberg ..................... 324/166

FOREIGN PATENT DOCUMENTS

DE         197 50 304 A1     5/1999

* cited by examiner

Primary Examiner—Bot LeDynh
(74) Attorney, Agent, or Firm—Michael J. Striker

(57) ABSTRACT

The method for correction of evaluation of a switching threshold of a magnetic sensor arrangement includes evaluating switching edges of a transmitter signal produced by a moving transmitter element and generating a signal output when the switching edges exceed or fall below a default threshold value. Individual threshold values are determined for each switching edge during the course of a measurement cycle to correct the default threshold value. This occurs by determining respective maximum and minimum values for each switching edge and then averaging them to obtain an average value for each switching edge. Then the average values are stored in a non-volatile memory as individual threshold values for subsequent correction.

7 Claims, 2 Drawing Sheets

METHOD AND ARRANGEMENT FOR CORRECTION OF EVALUATION OF A SWITCHING THRESHOLD OF A MAGNETIC SENSOR

BACKGROUND OF THE INVENTION

1. Field of the Invention

The present invention relates to a method and arrangement for correction of the evaluation of a switching threshold of a magnetic sensor, especially for analysis of motion of a transmitter wheel, in which switching edges of a sensor signal are evaluated and the magnetic sensor outputs a signal when the switching edges exceed or drop below a predetermined threshold value.

2. Related Art

So-called active rotation sensors and position sensors, as are used e.g. or control of motors or also in transmission and vehicle dynamics control in motor vehicles, are known. These sensors operate as phase transmitters, rotation speed transmitters or as so-called rotation speed sensors. The integrated circuits used in connection with these sensors for detection and evaluation, e.g. the so-called sensor ASICs, produce an electrical pulse edge from each magnetic pulse edge. That is a change of a binary output signal from Low to High or the reverse occurs or an electrical pulse of a definite length is produced.

Magnetic sensor arrangements are known in themselves, which for example operate with fixed threshold values. These sensor circuits have fixed threshold values which cannot be corrected and which produce errors due to transmitter wheel defects that are reproduced in the output signal. On the other hand, there are so-called self-calibrating sensors, which determine the minima and maxima of the measured values and then correct their circuit thresholds, e.g. by determining a general or overall average value. However faults in the transmitter wheel change the amplitudes of extrema, which are derived for determination of the switching threshold correction and produce errors in the output signals of these sensors.

Furthermore programmable sensors are known, in which a turn-on-switching threshold and a position of the desired switching threshold between the magnetic extrema can be programmed non-volatile in addition to the self-calibration. Both occur integrally for the entire transmitter wheel. Also in this case eccentricities in the transmitter wheel cause angle errors in the output signal of the sensor.

For all these prior art cases some transmitter wheel faults, such as pitch errors or graduation errors in multiple wheels or also eccentricities, e.g. of camshaft transmitter wheels, cannot be corrected.

For example an arrangement for contactless rotation angle determination by means of a pulse-generating wheel is described in DE 197 50 304 A1. In this arrangement rotation direction detection is possible, whereby a change of spacing of the pulse generating elements is performed in one rotation direction and thus the key ratio changes.

SUMMARY OF THE INVENTION

It is an object of the present invention to provide a method of correcting the evaluation of a switching threshold in a magnetic sensor arrangement of the above-described kind that does not suffer from the disadvantages of the known methods.

It is also an object of the present invention to provide an arrangement or device for performing the method according to the invention.

According to the invention the method for correction of evaluation of a switching threshold of a magnetic sensor arrangement, comprises a) evaluating switching edges of a transmitter signal derived from by a moving transmitter element;

b) generating a signal output when the switching edges exceed or fall below a default threshold value;

c) determining individual threshold values for each switching edge during the course of a measurement cycle by determining respective maximum and minimum values of each switching edge, averaging the maximum and minimum values of each switching edge so determined for this measurement cycle to obtain average values and storing the average values in a non-volatile memory as the individual threshold values.

The heart or core of the invention is thus the individual correction of the switching thresholds for each individual magnetic edge and the storage of the individually determined or corrected non-volatile threshold values in the nonvolatile memory. Inaccuracies in the magnetic sensor operation arise due to defects in the magnetic stimulation, such as e.g. by partial defects or eccentricities in a transmitter wheel used as the transmitter element. In a simple manner an improvement of the above-descried magnetic sensor is achieved so that these inaccuracies are minimized or completely suppressed and an optimum adjustment of the transmitter element and the sensor is attained.

In a preferred embodiment of the method the measurement cycle is started by detecting a marking on the transmitter element in the form of an increased period length between two switching edges. Alternatively the measurement cycle is started by detecting a marking in the form of an increased magnetic maximum on the transmitter element.

In a preferred embodiment of the method during operation of the magnetic field sensor a pre-set value is stored as a default threshold level for each threshold value, which is corrected in the first passage through a measurement cycle.

A computation of the average values of the maximum and minimum for each switching edge to find its corrected switching threshold value can be performed with a computer chip or module for evaluating the respective maxima and minima. Furthermore a non-volatile memory can be provided in an advantageous manner, in which the respective threshold values of a measurement cycle are stored.

The magnetic sensor arrangement can preferably include a transmitter wheel as the transmitter element and evaluates its rotation or rotational position. The switching edges in this arrangement are produced by magnetic field influencing or producing sensing elements. Hall elements or magnetoresistive elements are provided, which are constructed as on an AMR or GMR basis.

In the present invention either individual corrections of the switching threshold values for each switching edge can take place for each individual switching edge, or also global corrections, such as e.g. temperature compensation or also global amplitude corrections. The programming of the individual switching values should occur in actually used transmitter wheels if necessary even according to their use in an engine or in a vehicle. It is thus guaranteed that the errors of the transmitter wheel can be locally corrected by the individual corrections of the switching thresholds or each individual magnetic edge.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
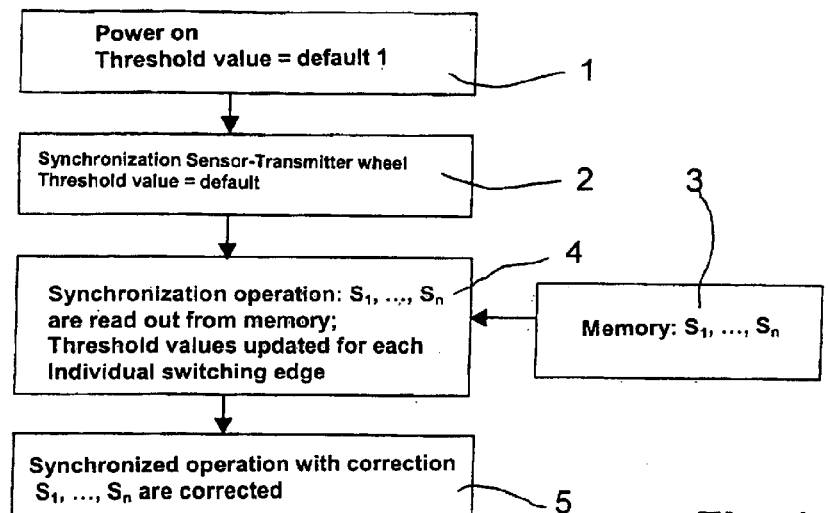
FIG. 1 is a flow chart of the method for correction of the switching signal of a transmitter wheel of a magnetic sensor according to the invention.

FIG. 1 is a flow chart of a method for detection of rotational motion of an unshown known transmitter wheel, for example for production of a pulse at a predetermined rotation angle, shown in relation to a sensor arrangement.

FIG. 1 shows the course of the method according to the invention, in which an unshown sensor is assembled in a non-programmed state for example in a motor vehicle and a test operation now occurs for calibration. After turning on the sensor arrangement a synchronization of the sensor arrangement is performed in the blocks 1 and 2.

In block 3 the synchronization operation with respective updated switching threshold values for each individual switching edge is initiated or signaled according to FIG. 1. For the synchronization operation $S_n$ values (with n=the number of cycles of a transmitter wheel) are read out from a non-volatile memory and the threshold value for each individual switching edge of the magnetic pulse signal is updated in block 4. The synchronization operation occurs with corrections in block 5. During subsequent operation the desired individual switching thresholds can then be corrected individually e.g. by an average value formation of local maximum and minimum values or by a global correction, like e.g. a temperature correction. Consideration of the individual switching threshold value stored in a non-volatile memory is especially advantageous in a calibration process for correction of transmitter wheel errors.

Figure 2:
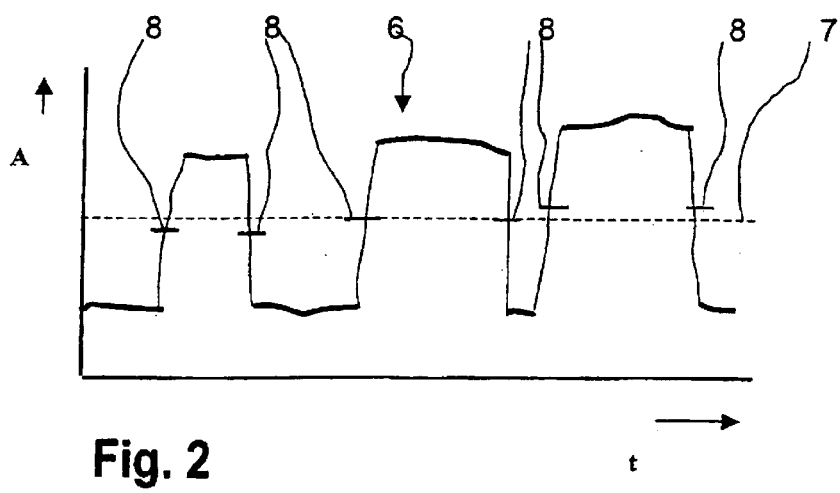
FIGS. 2 and 3 are graphical illustrations of switching edges of a switching signal in a known magnetic sensor shown in relation to a fixed switching threshold with and without error influences respectively.
Figure 3:
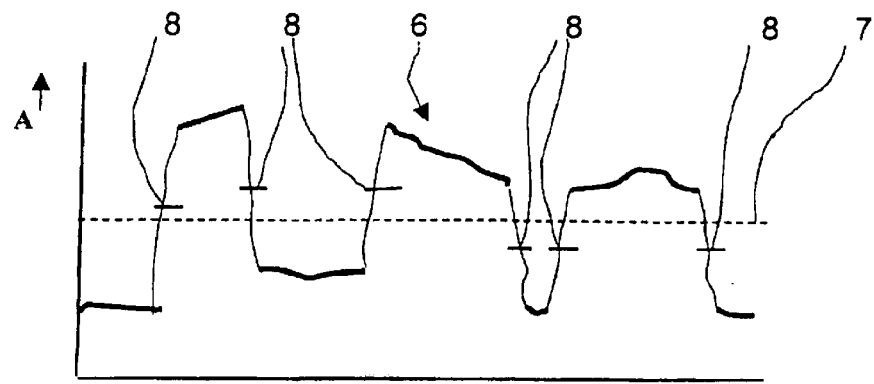

The variation of the amplitude A of an output signal 6 of a magnetic sensor arrangement versus time during detection is shown in FIGS. 2 and 3 when the conventional or prior art fixed switching threshold 7 is used. The behavior of the amplitude A is shown in FIG. 2 for a transmitter wheel without any eccentricity, while in FIG. 3 the amplitude variation is shown for a transmitter wheel with a considerable eccentricity. There are no large errors between the fixed switching threshold 7 and the respective average values 8 of the switching edge maxima and minima in the case of the transmitter wheel without eccentricity. However there are significant deviations in the case of the transmitter wheel with considerable eccentricity as shown by the course of the output signals 6 from FIG. 3.

Figure 4:
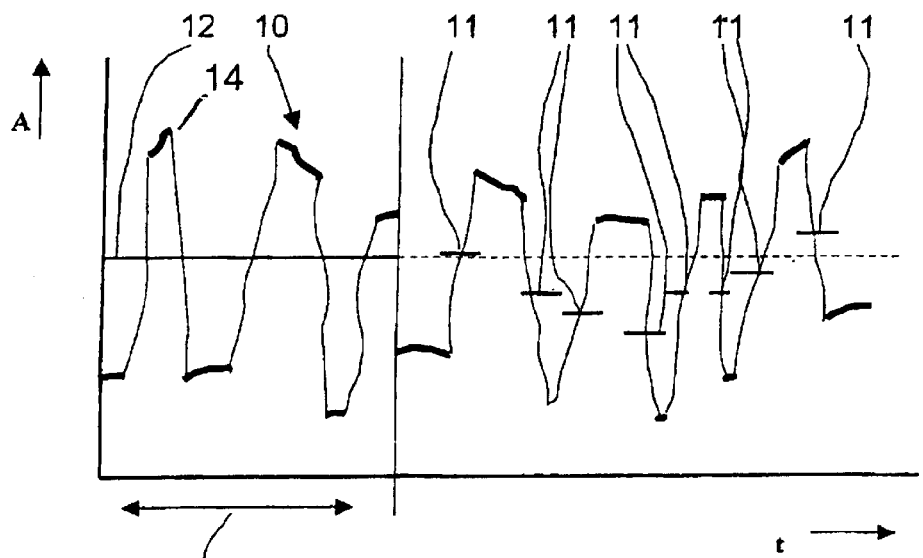
FIG. 4 is a graphical illustration of switching edges of a pulsed switching signal in a magnetic sensor arrangement with individually adjusted switching threshold values according to the method of the invention at the switching edges.

The method according to the invention with the individual switching thresholds with the behavior 10 shown in FIG. 4 can be obtained with a so-called sensor ASIC formed as an integrated circuit in a magnetic sensor arrangement for rotation angle determination, for example in a unit in a motor vehicle. The sensor ASIC permits a specific programmable switching threshold 11 for each individual magnetic signal edge and a pre-set so-called default switching threshold 12 for the turned on state in the synchronization region 13 of FIG. 4.

A non-volatile memory, which can be a PROM, an EPROM or an EEPROM, can be made available for this sort of switching circuit. Furthermore an interface can be provided so that the individual switching thresholds can be changed and responded to. The number n of magnetic pulses in a revolution of the transmitter wheel is deposited by means of the switching thresholds.

The switching circuit must detect the reference or null position of the transmitter wheel in order to activate the programmed switching threshold at the correct position of the transmitter wheel. This detection can happen either by a marking, such as a clearly increased period length, e.g. by a factor of 2, for example a broad gap/broad pulse, or also by the use of an absolute magnetic maximum 14 according to FIG. 4 at the transmitter wheel periphery.

In operation after turning on the circuit the sensor arrangement begins operation according to block 1 of FIG. 1 with the programmed default threshold value 12 and the synchronization according to block 2 occurs in FIG. 1 and in the region 13 shown in FIG. 4. In this synchronization the sensor arrangement determines and marks minima and maxima of the magnetic amplitude of the pulsed signal 10 and their temporal position and counts the pulses by averaging, as often the pre-set default threshold value is passed. After the transmitter wheel has performed a complete revolution, i.e. 2*n times the switching threshold is exceeded, the reference edge is determined.

For this purpose, as described above, in the simplest case the magnetic edge following the absolute maximum of a revolution of the transmitter wheel can be used, which may be clearly detected after one complete revolution. As soon as this is again reached the synchronization is halted after region 13. The sensor changes its switching thresholds 11 according to its internal list in the non-volatile memory in the region following region 13 according to block 3 of FIG. 1. In this way it can, for example, correct for the eccentricity of the transmitter wheel. The time point of the change of the threshold values of one input list to the next is selected in such a way that twin or double pulses do not occur.

The disclosure in German Patent Application 103 45 734.8 of Oct. 1, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and arrangement for correction of the evaluation of a threshold value in a magnetic sensor, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method for correction of evaluation of a switching threshold of a magnetic sensor arrangement, said method comprising the steps of:
    a) evaluating switching edges of a transmitter signal produced by a moving transmitter element;
    b) generating a signal output when said switching edges exceed or fall below a default threshold value;

c) determining individual threshold values for each of the switching edges during the course of a measurement cycle by determining respective maximum and minimum values of each of said switching edges, averaging said maximum and minimum values of each of said switching edges so determined for said measurement cycle to obtain average values and storing said average values in a non-volatile memory as said individual threshold values.

2. The method as defined in claim 1, further comprising starting said measurement cycle by detecting a marking in the form of an increased period length between two of said switching edges on said transmitter element.

3. The method as defined in claim 1, further comprising starting said measurement cycle by detecting a marking in the form of an increased magnetic maximum on said transmitter element.

4. The method as defined in claim 1, wherein said default threshold value is stored in operation of the magnetic sensor arrangement, which is corrected after a first cycle.

5. An arrangement for correction of evaluation of a switching threshold of a magnetic sensor arrangement, said arrangement comprising:

means for evaluating switching edges of a transmitter signal produced by a moving transmitter element;

means for generating a signal output when said switching edges exceed or fall below a default threshold value; and means for determining individual threshold values for each of the switching edges during the course of a measurement cycle by determining respective maximum and minimum values of each of said switching edges and for averaging said maximum and minimum values of each of said switching edges so determined for said measurement cycle in order to obtain average values and for storing said average values in a non-volatile memory as said individual threshold values;

a computer component comprising said means for determining said individual threshold values for each of said switching edges; and said non-volatile memory for said individual threshold values.

6. The arrangement as defined in claim 5, wherein the moving transmitter element is a transmitter wheel and said signal output is a measure of rotation speed or rotation angle of said transmitter wheel.

7. The arrangement as defined in claim 6, wherein said switching edges are produced by magnetic field influencing or generating components and said magnetic field sensing elements are Hall elements or magneto-resistive elements, which are constructed on an AMR or GMR basis.

* * * * *